United States Patent
Park et al.

(10) Patent No.: US 9,792,877 B2
(45) Date of Patent: Oct. 17, 2017

(54) DATA PROCESSING DEVICE AND DISPLAY SYSTEM INCLUDING THE SAME

(71) Applicant: Samsung Display Co., Ltd., Yongin, Gyeonggi-Do (KR)

(72) Inventors: Sungjae Park, Wonju-si (KR); Jai-Hyun Koh, Hwaseong-si (KR); Se Ah Kwon, Seoul (KR); Seokyun Son, Yongin-si (KR); Ik Soo Lee, Seoul (KR)

(73) Assignee: SAMSUNG DISPLAY CO., LTD, Gyeonggi-Do (KR)

( * ) Notice: Subject to any disclaimer, the term of this patent is extended or adjusted under 35 U.S.C. 154(b) by 264 days.

(21) Appl. No.: 14/250,830

(22) Filed: Apr. 11, 2014

(65) Prior Publication Data

US 2014/0306983 A1    Oct. 16, 2014

(30) Foreign Application Priority Data

Apr. 12, 2013    (KR) .................. 10-2013-0040223

(51) Int. Cl.
| | |
|---|---|
| *G06T 7/40* | (2017.01) |
| *G09G 5/02* | (2006.01) |
| *G09G 3/20* | (2006.01) |
| *G09G 5/28* | (2006.01) |
| *G06T 7/90* | (2017.01) |
| *G09G 5/20* | (2006.01) |

(52) U.S. Cl.
CPC ............... *G09G 5/02* (2013.01); *G06T 7/90* (2017.01); *G09G 3/2003* (2013.01); *G09G 5/28* (2013.01); *G09G 5/20* (2013.01); *G09G 2300/0452* (2013.01); *G09G 2320/0242* (2013.01); *G09G 2340/0457* (2013.01); *G09G 2340/06* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 5,630,037 A | * | 5/1997 | Schindler | G06T 5/007 345/592 |
| 6,243,070 B1 | * | 6/2001 | Hill | G02F 1/133514 345/589 |
| 6,266,439 B1 | | 7/2001 | Pollard et al. | |

(Continued)

FOREIGN PATENT DOCUMENTS

| | | |
|---|---|---|
| CN | 101176108 A | 5/2008 |
| EP | 2639785 A3 | 4/2014 |

(Continued)

*Primary Examiner* — Barry Drennan
*Assistant Examiner* — Jason Pringle-Parker
(74) *Attorney, Agent, or Firm* — Cantor Colburn LLP

(57) ABSTRACT

A data processing device, which processes and provides data to a plurality of logical pixels of a display device, includes: a data analysis part which analyzes information of text, color, line or edge in each of the data; and a data compensation part which compensates text data corresponding to a logical pixel which does not express text color among the data having the information of text based on the information analyzed in the data analysis part, where each of the logical pixels of the display device comprises at least one of red, green, blue and optional color sub-pixels.

22 Claims, 12 Drawing Sheets

(56) References Cited

U.S. PATENT DOCUMENTS

| | | | |
|---|---|---|---|
| 6,392,759 B1* | 5/2002 | Kuwata | G06T 5/004 358/1.9 |
| 7,263,223 B2* | 8/2007 | Irwin | H04N 1/6072 382/176 |
| 7,283,683 B1 | 10/2007 | Nakamura et al. | |
| 7,352,374 B2* | 4/2008 | Brown Elliott | G06F 3/14 345/586 |
| 7,386,168 B2 | 6/2008 | Misawa | |
| 7,417,648 B2* | 8/2008 | Credelle | G02F 1/133514 345/690 |
| 7,787,702 B2 | 8/2010 | Brown et al. | |
| 8,111,926 B2* | 2/2012 | Liao | G06K 9/4604 358/3.21 |
| 8,421,820 B2* | 4/2013 | Brown Elliott | G09G 3/20 345/204 |
| 8,698,834 B2* | 4/2014 | Brown Elliott | G09G 5/02 345/207 |
| 8,872,861 B2* | 10/2014 | Botzas | G09G 3/3413 345/102 |
| 8,884,994 B2* | 11/2014 | Brown Elliott | G09G 5/02 345/102 |
| 9,153,200 B2* | 10/2015 | Brown Elliott | G09G 5/02 |
| 2002/0031263 A1* | 3/2002 | Yamakawa | H04N 1/409 382/199 |
| 2002/0093502 A1 | 7/2002 | Koyama | |
| 2003/0011603 A1 | 1/2003 | Koyama et al. | |
| 2003/0128179 A1 | 7/2003 | Credelle | |
| 2003/0227466 A1 | 12/2003 | Stamm et al. | |
| 2004/0051724 A1 | 3/2004 | Elliott et al. | |
| 2004/0080479 A1 | 4/2004 | Credelle | |
| 2004/0095521 A1 | 5/2004 | Song et al. | |
| 2004/0165782 A1 | 8/2004 | Misawa | |
| 2004/0234163 A1 | 11/2004 | Lee et al. | |
| 2005/0069217 A1* | 3/2005 | Mukherjee | H04N 1/4092 382/266 |
| 2005/0179675 A1* | 8/2005 | Hekstra | G09G 3/2003 345/204 |
| 2007/0109327 A1* | 5/2007 | Cok | G09G 3/2003 345/690 |
| 2007/0217701 A1* | 9/2007 | Liu | G06K 9/38 382/234 |
| 2007/0257866 A1* | 11/2007 | Cok | G09G 3/20 345/76 |
| 2008/0049048 A1 | 2/2008 | Credelle et al. | |
| 2008/0056604 A1* | 3/2008 | Choe | G09G 3/2003 382/269 |
| 2009/0058873 A1 | 3/2009 | Elliott et al. | |
| 2009/0244366 A1* | 10/2009 | Kamimura | G06T 5/009 348/441 |
| 2010/0149204 A1 | 6/2010 | Han | |
| 2011/0148908 A1* | 6/2011 | Jeong | G09G 5/02 345/590 |
| 2012/0026216 A1* | 2/2012 | Brown Elliott | G09G 3/20 345/694 |
| 2012/0287143 A1* | 11/2012 | Brown Elliott | G09G 5/02 345/589 |
| 2012/0287146 A1* | 11/2012 | Brown Elliott | G09G 5/02 345/590 |
| 2012/0287147 A1* | 11/2012 | Brown Elliott | G09G 5/02 345/593 |
| 2012/0287148 A1* | 11/2012 | Brown Elliott | G09G 5/02 345/593 |
| 2012/0287168 A1* | 11/2012 | Botzas | G09G 3/3413 345/690 |
| 2013/0027285 A1 | 1/2013 | Inada | |
| 2013/0215360 A1* | 8/2013 | Pollack | G09G 3/3413 349/61 |
| 2015/0062140 A1* | 3/2015 | Levantovsky | G09G 5/37 345/581 |

FOREIGN PATENT DOCUMENTS

| | | |
|---|---|---|
| JP | H09139856 A | 5/1997 |
| JP | H11213149 A | 8/1999 |
| JP | 2002006303 A | 1/2002 |
| JP | 2004029598 A | 1/2004 |
| JP | 2004260327 A | 9/2004 |
| JP | 2008546006 A | 12/2008 |
| JP | 2009055121 A | 3/2009 |
| JP | 2010507126 A | 3/2010 |
| KR | 1020030045956 A | 6/2003 |
| KR | 1020030086397 A | 11/2003 |
| KR | 1020100054242 A | 5/2010 |
| KR | 1020110026786 A | 3/2011 |
| WO | 2006127555 A2 | 11/2006 |
| WO | 2008047313 A2 | 4/2008 |
| WO | 2011129376 A1 | 10/2011 |

* cited by examiner

DATA PROCESSING DEVICE AND DISPLAY SYSTEM INCLUDING THE SAME

This application claims priority to Korean Patent Application No. 10-2013-0040223, filed on Apr. 12, 2013, and all the benefits accruing therefrom under 35 U.S.C. §119, the content of which in its entirety is herein incorporated by reference.

BACKGROUND

1. Field

The disclosure relates to a data processing device and a display system including the data processing device, and more particularly, to a data processing device that selectively compensates data having information of text and a display system including the data processing device.

2. Description of the Related Art

A conventional display device displays an image using a display panel including a plurality of logical pixels, each of which includes sub-pixels that expresses red, green and blue, for example.

Recently, a pentile technology for improving brightness of a display device by designing one logical pixel to have parts of red, green, blue and optional color sub-pixels is being developed. In such a display device having a pentile structure, an opening ratio and a penetration ratio of the display device may be substantially improved.

In such a display device having the pentile structure, data having information of red, green, blue and optional color is applied to one logical pixel. However, since one logical pixel includes parts of red, green, blue and optional color sub-pixels, it may display only parts of red, green, blue and optional color.

SUMMARY

An exemplary embodiment of a data processing device, which processes and provides data to a plurality of logical pixels of a display device, includes: a data analysis part which analyzes information of text, color, line or edge in each of the data; and a data compensation part which compensates text data corresponding to a logical pixel which does not express text color among the data having the information of text based on the information analyzed in the data analysis part, where each of the logical pixels of the display device includes at least one of red, green, blue and optional color sub-pixels.

An exemplary embodiment of a display system includes: a rendering part which receives an image data and renders the received image data to generate rendered image data; and a data processing device which processes and provides the rendered image data to the display device, where the data processing device includes: a data analysis part which analyzes information of text, color, line or edge of the rendered image data; and a data compensation part which compensates text data corresponding to a logical pixel which does not display a text color among data having the information of text based on the information analyzed in the data analysis part.

BRIEF DESCRIPTION OF THE DRAWINGS

The above and other feature of the invention will become readily apparent by reference to the following detailed description when considered in conjunction with the accompanying drawings, in which.

DETAILED DESCRIPTION

Figure 1:
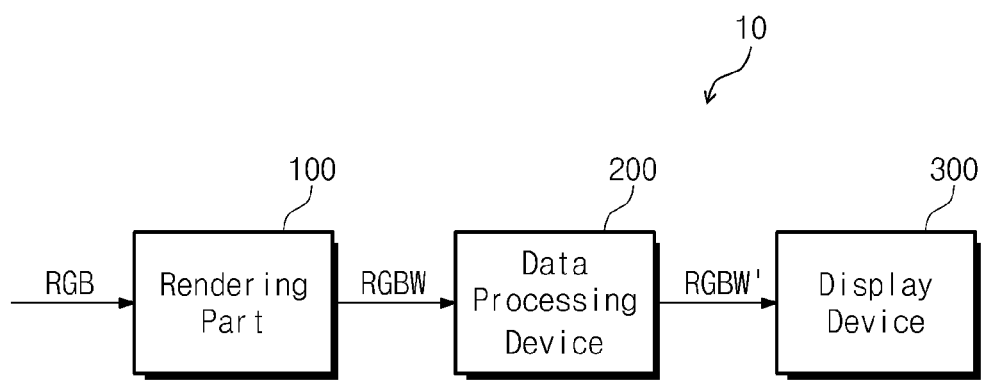
FIG. 1 is a block diagram showing an exemplary embodiment of a display system according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing an exemplary embodiment of a display system 10 according to the invention.

Referring to FIG. 1, an exemplary embodiment of the display system 10 includes a rendering part 100, a data processing device 200 and a display device 300.

The rendering part 100 receives an image data RGB, and then renders the image data RGB to generate rendered image data RGBW. The rendered image data RGBW includes data corresponding to logical pixels in the display device 300.

The rendering part 100 maps image data RGB including red, green and blue data to the rendered image data RGBW including red, green, blue and optional color data. The optional color may be a color different from red, green and blue. The color data of the rendered image data RGBW may correspond to sub-pixels in the display device 300. In an exemplary embodiment, where the sub-pixels include red, green, blue and white sub-pixels, the image data RGBW may include red, green, blue and white data.

The rendering part 100 may map red, green and blue gamut based on red, green and blue data to red, green, blue and optional color gamut using a gamut mapping algorithm ("GMA").

The rendering part 100 may linearize the image data RGB using a gamma function before rendering the image data RGB. The rendering part 100 may non-linearize the linearized image data RGB using a reverse gamma function.

The data processing device 200 receives the rendered image data RGBW, and then performs a data processing on the received rendered image data RGBW to output compensated data RGBW'.

Figure 2:
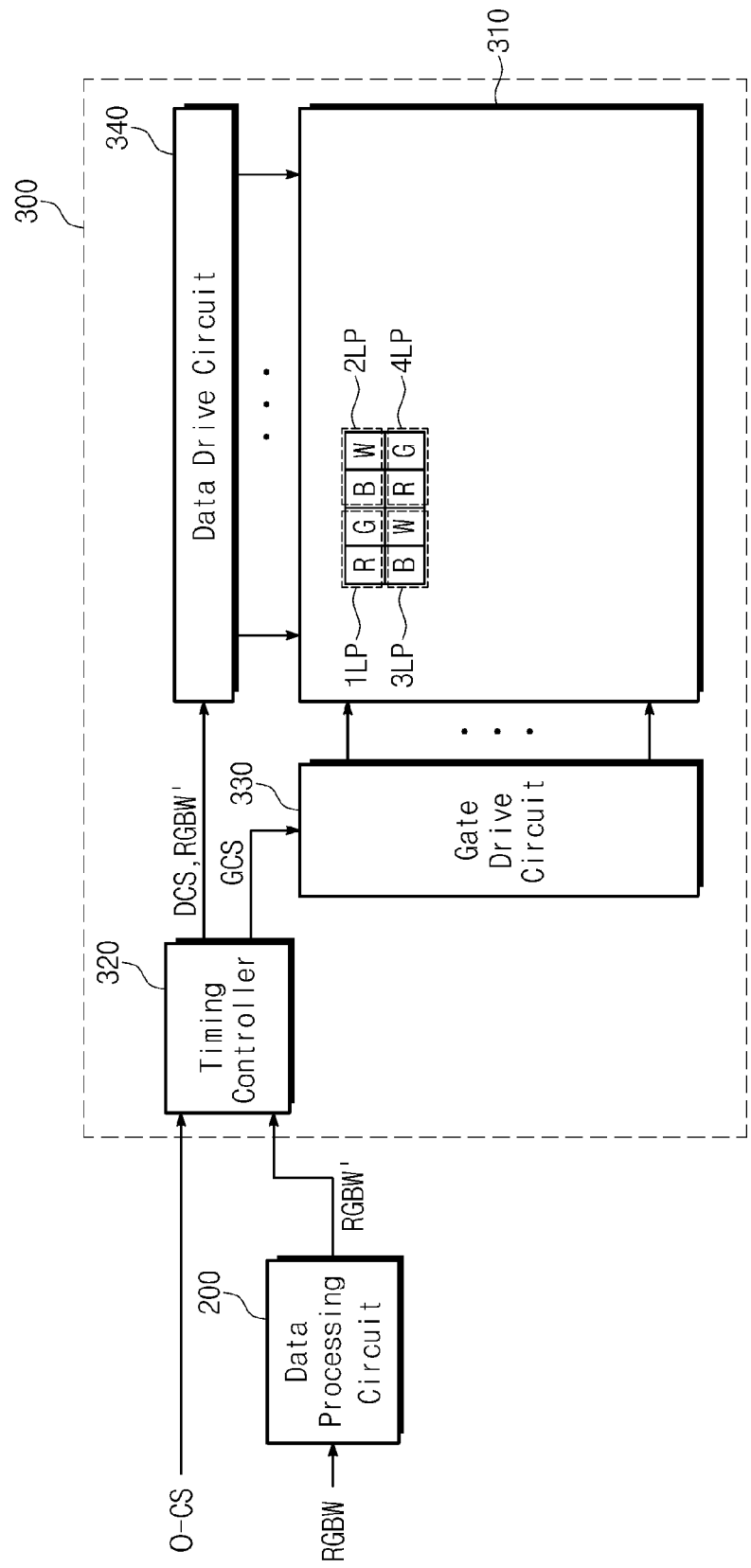
FIG. 2 is a block diagram showing an exemplary embodiment of a display device illustrated in FIG. 1.

FIG. 2 is a block diagram showing an exemplary embodiment of a display device illustrated in FIG. 1.

In an exemplary embodiment, the display device 300 includes a display panel 310, a timing controller 320, a gate drive circuit 330 and a data drive circuit 340.

The display panel 310 includes a screen for displaying an image and includes a plurality of sub-pixels. In such an embodiment, the sub-pixels may have a pentile structure or a multi-primary color ("MPC") structure.

The sub-pixels may include base color sub-pixels and an optional color sub-pixel. The base color sub-pixels may include a red sub-pixel, a green sub-pixel and a blue sub-pixel. The optional color sub-pixel may include at least one of white, yellow, cyan and magenta sub-pixels. In an exemplary embodiment, as shown in FIG. 2, the display panel 310 may include base color sub-pixels and a white sub-pixel, for example.

A plurality of logical pixels 1LP to 4LP is defined in the display panel 310. In an exemplary embodiment, as shown in FIG. 2, the display panel 310 includes first through fourth logical pixels 1LP to 4LP, for example. In FIG. 2, only four logical pixels 1LP to 4LP are shown for convenience of illustration, but the first through fourth logical pixels 1LP to 4LP may be repeatedly arranged in the display panel 310.

Each of the first through fourth logical pixels 1LP to 4LP includes at least one of red, green, blue and optional color sub-pixels. In one exemplary embodiment, for example, each of the first logical pixel 1LP and the fourth logical pixel 4LP includes a red ("R") sub-pixel and a green ("G") sub-pixel, and each of the second logical pixel 2LP and the third logical pixel 3LP includes a blue ("B") sub-pixel and a white ("W") sub-pixel. In an exemplary embodiment, as shown in FIG. 2, each of the logical pixels 1LP to 4LP may include two sub-pixels, but the invention is not limited thereto. In an exemplary embodiment, each of the logical pixels 1LP to 4LP may include at least one of red, green, blue and optional color sub-pixels, and the logical pixels 1LP to 4LP may be variously defined.

Image data that the display device 300 receives from the data processing device 200, e.g., the compensated image data RGBW', may include red, green, blue and white data corresponding to the first through fourth logical pixels 1LP to 4LP. In an exemplary embodiment, each of the first through fourth logical pixels 1LP to 4LP may display a portion of red, green, blue and white data. In such an embodiment, first data corresponding to the first logical pixel 1LP includes red, green, blue and white data, but only red and green may be displayed by the first logical pixel 1LP. In such an embodiment, second data corresponding to the second logical pixel 2LP includes red, green, blue and white data, but only blue and white may be displayed by the second logical pixel 2LP.

The data processing device 200 provides the compensated data RGBW' to the timing controller 320. In an exemplary embodiment, the data processing device 200 may be included in the display device 300, e.g., in the timing controller 320 of the display device 300.

The timing controller 320 converts a data format of the compensated data RGBW' into a data format corresponding to the data drive circuit 340, and provides the compensated data RGBW' to the data drive circuit 340. The timing controller 320 receives control signals O-CS and converts the control signals O-CS into a data control signal DCS and a gate control signal GCS. The timing controller 320 provides the data control signal DCS to the data drive circuit 340, and provides the gate control signal GCS to the gate drive circuit 330.

The data drive circuit 340 converts the compensated data RGBW' into a data voltage in response to the data control signal DCS, and provides the data voltage to the display panel 310. The gate drive circuit 330 sequentially outputs gate signals for driving the sub-pixels on a row-by-row basis in response to the gate control signal GCS.

Figure 3:
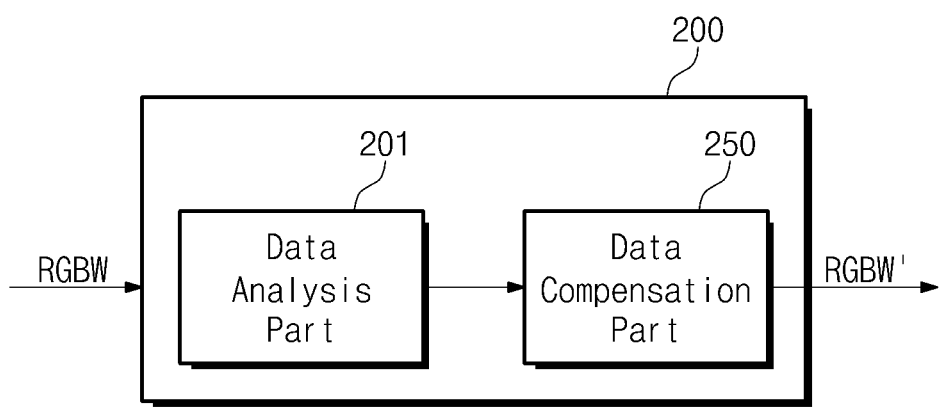
FIG. 3 is a block diagram illustrating an exemplary embodiment of a data processing device illustrated in FIGS. 1 and 2.
Figure 4:
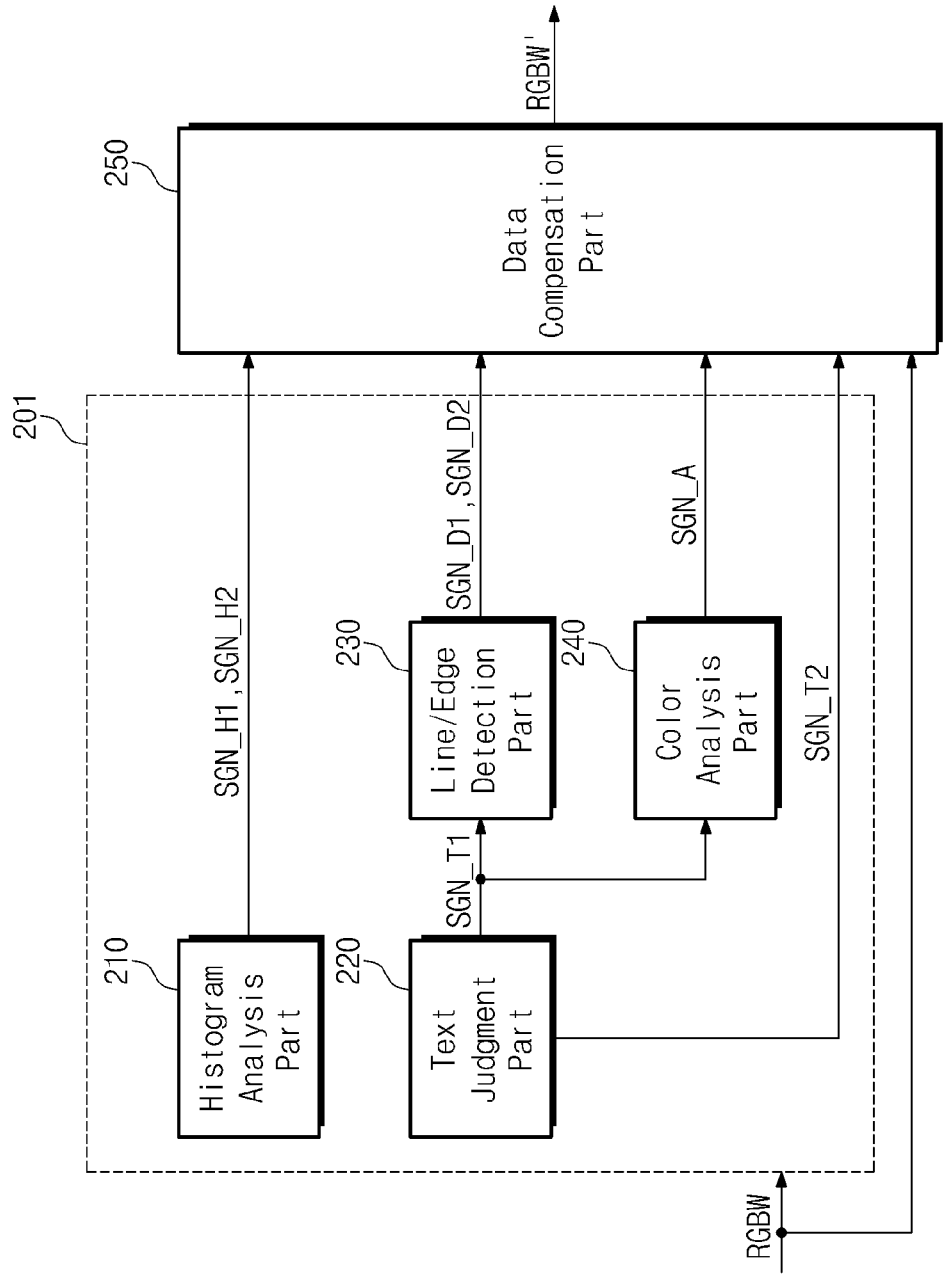
FIG. 4 is a block diagram illustrating an exemplary embodiment of a data analysis part of FIG. 3.

FIG. 3 is a block diagram illustrating an exemplary embodiment of a data processing device 200 illustrated in FIGS. 1 and 2. FIG. 4 is a block diagram illustrating an exemplary embodiment of a data analysis part of FIG. 3.

Referring to FIGS. 3 and 4, an exemplary embodiment of the data processing device 200 includes a data analysis part 201 and a data compensation part 250.

The data analysis part 201 analyzes data provided thereto on a block-by-block basis, e.g., analyzes each image block of an image corresponding to the rendered image data RGBW, and the data analysis part 201 provides a result of analysis to the data compensation part 250. The data analysis part 201 analyzes information of text, color, line and edge in each data corresponding to the block.

As shown in FIG. 4, an exemplary embodiment of the data analysis part 201 includes a histogram analysis part 210, a text judgment part 220, a line/edge detection part 230 and a color analysis part 240.

Figure 5:
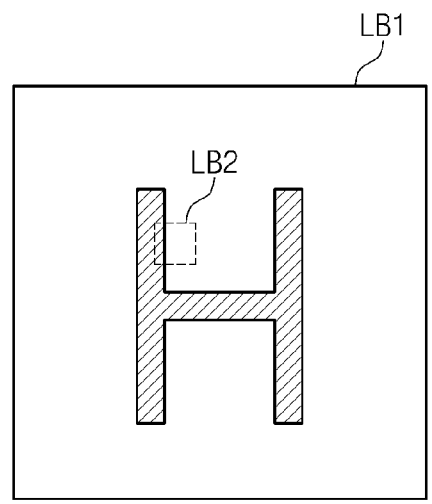
FIG. 5 is a drawing showing an operation of an exemplary embodiment of a histogram analysis part of FIG. 4.

FIG. 5 is a drawing for explaining an operation of an exemplary embodiment of a histogram analysis part 210 of FIG. 4. In an exemplary embodiment, as shown in FIG. 5, a green text "H" may be displayed on a black background in a first logical pixel block LB1 of the display panel 310. The first logical pixel block LB1 may be defined by a plurality of logical pixels, and data corresponding to the first logical pixel block LB1 may be a unit data for histogram analysis. In such an embodiment, a plurality of first logical pixel blocks may be defined in the display panel 310, and each first logical pixel block may display an image corresponding to a unit data for histogram analysis.

Referring to FIGS. 3 through 5, the histogram analysis part 210 receives the rendered image data RGBW, performs a histogram analysis on the data corresponding to the first logical pixel block LB1 of the rendered image data RGBW, and thereby determines color of text and background of an image displayed in the first logical pixel block LB1.

The histogram analysis part 210 analyzes the distribution of grayscale value of red, green and blue data of the data corresponding to the first logical pixel block LB1, and detects color having a grayscale value greater than a first predetermined value. In such an embodiment, when each of two or more colors have a grayscale value greater than the first predetermined value, the histogram analysis part 210 detects a color having the smallest volume of distribution in the first logical pixel block LB1 as a text color, and detects the other colors as a background color. The first predetermined value may be set based on the minimum grayscale value of the color of text that is displayed in the first logical pixel block LB1.

In an exemplary embodiment, as shown in FIG. 5, the histogram analysis part 210 may determine the green and black have a volume of distribution greater than the first predetermined value and detects green, which has the less volume of distribution, as a text and the black as a background.

The first logical pixel block LB1 may be defined by at least about 10,000 logical pixels that are adjacent to one another. In one exemplary embodiment, for example, the first logical pixel block LB1 may be defined by 100×100 logical pixels. In an exemplary embodiment, the display panel 310 may include 2,000×1,000 logical pixels, and the histogram analysis part 210 performs a histogram analysis on every data corresponding to 200 first logical pixel blocks LB1.

In such an embodiment, the first logical pixel block LB1 is defined by logical pixels greater than 100×100, such that text color and background color are substantially accurately detected when the background has more than one color, or text is large and thick.

The histogram analysis part 210 may perform a function (e.g., determining whether text exists in the data corresponding to the first logical pixel block LB1), which may be performed in another part (e.g., text judgment part 220), such that accuracy in detecting information of text is substantially improved.

In an exemplary embodiment, the histogram analysis part 210 outputs the information of text and a background of data corresponding to the first logical pixel block LB1 as a first histogram signal SGN_H1. In such an embodiment, when data corresponding to the first logical pixel block LB1 do not include information of text, for example, when the first logical pixel block LB1 is displayed with a solid color background, the histogram analysis part 210 outputs a second histogram signal SGN_H2.

The histogram analysis part 210 provides the first histogram signal SGN_H1 or the second histogram signal SGN_H2 to the data compensation part 250.

Figure 6:
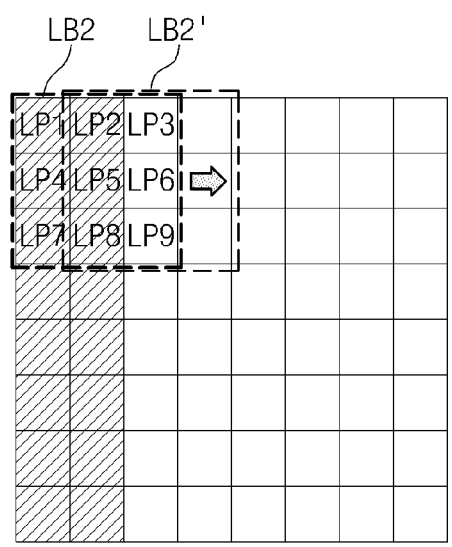
FIG. 6 is an enlarged view of a portion including a second logical pixel block of FIG. 5.

FIG. 6 is an enlarged view of a portion including a second logical pixel block of FIG. 5. In FIG. 6, an enlarged view of 8×8 logical pixels in the first logical pixel block LB1 of FIG. 5 are illustrated. In FIG. 6, data corresponding to logical pixels in a first logical pixel column and a second logical pixel column have information of green, and data corresponding to the remaining logical pixels have information of black.

In an exemplary embodiment, as described above, each of the logical pixels, e.g., each of first to ninth logical pixels LP1 to LP9, may include red and green sub-pixels or blue and white sub-pixels. Each of the first logical pixel LP1, the third logical pixel LP3, the fifth logical pixel LP5, the seventh logical pixel LP7 and the ninth logical pixel LP9 may include red and green sub-pixels. Each of the second logical pixel LP2, the fourth logical pixel LP4, the sixth logical pixel LP6 and the eighth logical pixel LP8 may include blue and white sub-pixels.

Data corresponding to the second logical pixel LP2, the fourth logical pixel LP4 and the eighth logical pixel LP8 have information of green. However, in such an embodiment, each of the second logical pixel LP2, the fourth logical pixel LP4 and the eighth logical pixel LP8 does not include a green sub-pixel such that green may not be displayed therein. Accordingly, a boundary of a text, e.g., "H" in FIG. 5, may not be effectively displayed. In case of displaying a maximally enlarged image, a boundary of green text "H" may crumble such that the green text "H" may not be effectively recognized by a viewer.

Referring to FIGS. 3, 4 and 6, the text judgment part 220 receives data, e.g., the rendered image data RGBW, and analyzes data corresponding to a second logical pixel block LB2 to detect whether the data includes information of text or not. The text judgment part 220 scans the data (the rendered image data RGBW of FIG. 2) corresponding to the first logical pixel block LB1 in the unit of data corresponding to the second logical pixel block LB2 while moving the second logical pixel block LB2 by a logical pixel row unit or a logical pixel column unit.

In an exemplary embodiment, as shown in FIG. 6, the second logical pixel block LB2 may include at least 3×3 logical pixels. As the number of logical pixels included in the second logical pixel block LB2 increases, reliability is improved but the number of the operation to be performed increases. The number of logical pixels in the second logical pixel block LB2 is less than the number of logical pixels in the first logical pixel block LB1. Hereinafter, an exemplary embodiment, where the second logical pixel block LB2 includes 3×3 logical pixels, will be described in further detail, for convenience of description.

The rendered image data RGBW includes first through ninth data corresponding to the first through ninth logical pixels LP1 to LP9 of the second logic al pixel block LB2, respectively.

The text judgment part 220 compares the maximum grayscale value of red, green and blue data of each of the first through ninth data with a second predetermined value to detect the information of text therein. The second predetermined value is the minimum grayscale value to be recognized as text having a color. The text judgment part 220 analyzes the first through ninth data to detect grayscale values of red, green, blue and white data therein. In such an embodiment, where each of the first data, the second data, the fourth data, the fifth data, the seventh data and the eighth data has a same specific grayscale value of green, the text judgment part 220 detect one of the grayscale value of the first data, the second data, the fourth data, the fifth data, the seventh data and the eighth data as the maximum grayscale value. When the detected maximum gradation value is greater than the second predetermined value with respect to the green color, the text judgment part 220 determines that the information of text exists in the first through ninth data. When the detected maximum gradation value is less than the second predetermined value with respect to the green color, the text judgment part 220 determines that the information of text does not exist in the first through ninth data. In an exemplary embodiment, where the second predetermined value may be 100, for example, when the detected maximum grayscale value is 200, the text judgment part 220 determines that the information of text exists in the first through ninth data, and when the detected maximum grayscale value is 10, the text judgment part 220 determines that the information of text does not exist in the first through ninth data.

The text judgment part 220 moves the second logical pixel block LB2 in a row or column direction after analyzing the first through ninth data corresponding to the second logical pixel block LB2, and then analyzes data corresponding to a next second logical pixel block LB2' to detect whether the information of text exists in the next second logical pixel block LB2'. The text judgment part 220 analyzes an entire of the data in the first logical pixel block LB1 in such a manner by using the second logical pixel block LB2 as a unit of analysis. In an exemplary embodiment, as described above, the text judgment part 220 may scan the second logical pixel block LB2 while moving the second logical pixel block LB2 by one logical pixel row unit or one logical pixel column unit. In an alternative exemplary embodiment, the text judgment part 220 may scan the second logical pixel block LB2 while moving the second logical pixel block LB2 by more than one logical pixel row unit or more than one logical pixel column unit. In such an embodiment, the second logical pixel block LB2 may not be moved by more than three logical pixel row unit or more than three logical pixel column unit to scan the entire of the data of the first logical pixel block LB1.

In an exemplary embodiment, when data corresponding to the second logical pixel block LB2 include information of the text, the text judgment part 220 outputs a first text signal SGN_T1 to the line/edge detection part 230 and the color analysis part 240. In such an embodiment, when data corresponding to the second logical pixel block LB2 do not include information of text, the text judgment part 220 outputs a second text signal SGN_T2 to the data compensation part 250.

In such an embodiment, where the text judgment part 220 judges whether the information of text exists or not, based on the maximum grayscale value of data corresponding to the second logical pixel block LB2 when the maximum grayscale value is greater than the second predetermined value, the text judgment part 220 outputs the first text signal SGN_T1 even in a case where all of the nine data correspond to text or a background.

The line/edge detection part 230 detects whether or not the data corresponds to a line or an edge with respect to the red, green and blue colors, based on the first text signal SGN_T1 provided from the text judgment part 220. The line/edge detection part 230 scans the entire of the data corresponding to the first logical pixel block LB1 using the second logical pixel block LB2 as a unit of scanning.

The second logical pixel block LB2 includes a reference logical pixel and adjacent logical pixels, which are adjacent to the reference logical pixel and surround the reference logical pixel. In FIG. 6, the reference logical pixel is the fifth logical pixel LP5 and the adjacent logical pixels are the first through fourth logical pixels LP1 to LP4 and the sixth through ninth logical pixels LP6 to LP9.

The line/edge detection part 230 detects a grayscale difference between data corresponding to the reference logical pixel (hereinafter, referred to as "reference data") and data corresponding to the adjacent logical pixels (hereinafter, referred to as "adjacent data") for each of the red, green and blue data. The line/edge detection part 230 detects a number of the grayscale difference greater than a third predetermined value among the grayscale differences between the reference data and the adjacent data. The line/edge detection part 230 detects the reference data as a line, an edge or a remainder other than the line and the edge based on the detected number of the grayscale difference greater than a third predetermined value. In an exemplary embodiment, the third predetermined value may be set to the minimum value of a grayscale difference between a text and a background. In such an embodiment, the third predetermined value may be less than the second predetermined value.

The line/edge detection part 230 determines the reference data as an edge when the detected number (N) of the grayscale difference greater than the third predetermined value satisfies the following in equation: 0≤N≤3, determines the reference data as a line when the detected number (N) of the grayscale difference greater than the third predetermined value satisfies the following in equation: 3≤N≤8, and determines the reference data as the remainder when the detected number (N) of the grayscale difference greater than the third predetermined value is zero (0), that is, N=0. As described above, the remainder means that the reference data does not correspond to an edge or a line. When all of the nine data in the second logical pixel block LB2 correspond to text or a background, the data are determined as the remainder. When the reference data is determined as a line, the reference data means that text and a background are constituted by a single line. When the reference data is determined as an edge, the reference data constitutes an outer covering of a text or background.

Figure 7:
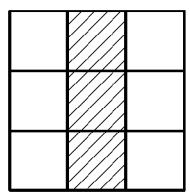
FIG. 7 is a drawing illustrating exemplary embodiments of images corresponding to data, which is detected as a line.
Figure 7:
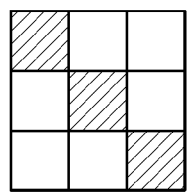
Figure 7:
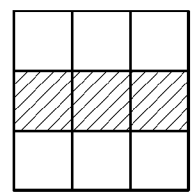
Figure 7:
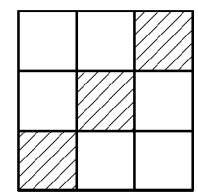
Figure 7:
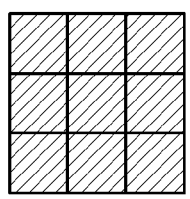
Figure 7:
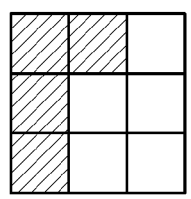
Figure 7:
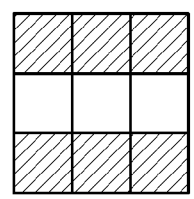
Figure 7:
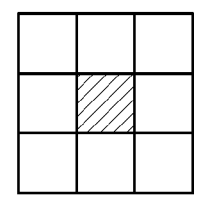
Figure 8:
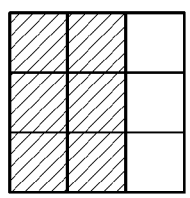
FIG. 8 is a drawing illustrating exemplary embodiments of images corresponding to data, which is detected as an edge.
Figure 8:
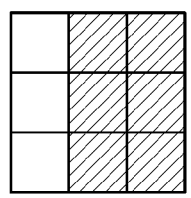
Figure 8:
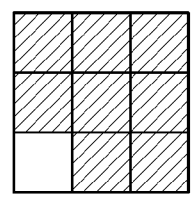
Figure 8:
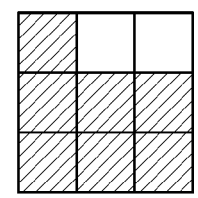

FIG. 7 is a drawing illustrating exemplary embodiments of the reference data detected as a line. FIG. 8 is a drawing illustrating exemplary embodiments of the reference data detected as an edge. In FIGS. 7 and 8, a grayscale difference between data corresponding to a logical pixel, in which an oblique line is drawn, and data corresponding to a logical pixel, in which an oblique line is not drawn, is greater than the third predetermined value.

In the second logical pixel block LB2 illustrated in FIG. 6, the line/edge detection part 230 detects a grayscale difference between fifth data corresponding to the fifth logical pixel LP5 and adjacent data corresponding to the adjacent logical pixels LP1 to LP4, LP6 to LP9 for each of the red, green and blue data. In the second logical pixel block LB2 shown in FIG. 6, first data, second data, fourth data, seventh data and eighth data have the same green grayscale value as the fifth data, a grayscale difference is not detected therebetween. In the second logical pixel block LB2 shown in FIG. 6, third data, sixth data and ninth data have a green grayscale difference with respect to the fifth data, and the green grayscale difference is greater than the third predetermined value. Accordingly, the number of data in which the detected green grayscale difference is greater than the third predetermined value is 3, and the line/edge detection part 230 determines the fifth data as an edge with respect to the green color. Since red and blue grayscale difference between the fifth data and adjacent data does not exist, the line/edge detection part 230 determines that the fifth data is neither an edge nor a line with respect to the red and blue colors.

The line/edge detection part 230 scans the entire of the data corresponding to the first logical pixel block LB1 using the second logical pixel block LB2 as a unit of scanning while moving the second logical pixel block LB2 by one logical pixel row unit or one logical pixel column unit.

When the data corresponding to the second logical pixel block LB2 is detected as a line or an edge, the line/edge detection part 230 provides a first detection signal SGN_D1 to the data compensation part 250. When the data is detected as the remainder, the line/edge detection part 230 provides a second detection signal SGN_D2 to the data to the data compensation part 250.

The line/edge detection part 230 detects whether or not the data provided thereto corresponds to a line or an edge with respect to the red, green and blue colors based on the first text signal SGN_T1 provided from the text judgment part 220.

Referring to FIGS. 4 and 6, the color analysis part 240 detects colors in each of the data provided thereto, e.g., the data corresponding to the first logical pixel block LB1, based on the first text signal SGN_T1. The color analysis part 240 scans entire of the data corresponding to the first logical pixel block LB1 using the second logical pixel block LB2 as a unit of analysis.

The color analysis part 240 compares the adjacent data with a reference data to generate an analysis signal SGN_A of the data for each of the red, green and blue data. When the color analysis part 240 analyzes the adjacent data with respect to one color, the analysis signal SGN_A includes an analysis signal of a reference color and an analysis signal of remaining colors other than the reference color. The analysis signal of the reference color and the analysis signal of the remaining colors may be a top signal, a bottom signal, a high signal or a low signal.

Figure 9:
FIG. 9 is a drawing illustrating a top signal (I), a bottom signal (II), a high signal (III) and a low signal (IV) of an exemplary embodiment of an analysis signal.

FIG. 9 is a drawing illustrating a top signal (I), a bottom signal (II), a high signal (III) and a low signal (IV) of an exemplary embodiment of the analysis signal.

Referring to FIG. 9, the top signal is a signal that is generated when data of a reference color exist in the reference data and does not exist at least a portion of the adjacent data. In the second logical pixel block LB2 of FIG. 6, where green is the reference color, the fifth data has data of green but the third, sixth and ninth data among the adjacent data do not have data of green, the color analysis part 240 generates the top signal with respect to the green color based on a result of the analysis of data corresponding to the second logical pixel block LB2.

The bottom signal is a signal which is generated when data of the reference color does not exist in the reference data and exists in at least a portion of the adjacent data. In the next second logical pixel block LB2' of FIG. 6, the reference logical pixel is a sixth logical pixel LP6, and the sixth data is the reference data. In the next second logical pixel block LB2', the sixth data does not have data of green but the second, fifth and eighth data among the adjacent data have data of green, the color analysis part 240 generates the bottom signal with respect to the green color based on a result of the analysis of data corresponding to the next second logical pixel block LB2'.

The high signal is a signal which is generated when data of the reference color exists in the reference data and all of the adjacent data. When green is the reference color, when all data corresponding to the second logical pixel block LB2 have data of green, the color analysis part 240 generates the high signal with respect to the green color.

The low signal is a signal which is generated when data of the reference color does not exist in the reference data and all of the adjacent data. When green is the reference color and all data corresponding to the second logical pixel block LB2 do not have data of green, the color analysis part 240 generates the low signal with respect to the green color.

Referring to FIGS. 4 and 6, the color analysis part 240 generates an analysis signal of the reference color and an analysis signal of the remaining colors for each of the red, green and blue colors. In an exemplary embodiment shown in FIG. 6, when green is set as the reference color, the color analysis part 240 generates the top signal with respect to the green color and generates the bottom signal with respect to the red and blue color. When red is set as the reference color, the color analysis part 240 generates the low signal with respect to the red color and generates the low signal with respect to the green and blue colors. When blue is set as the reference color, the color analysis part 240 generates the low signal with respect to the blue color and generates the low signal with respect to the red and green colors.

The color analysis part 240 provides the analysis signal SGN_A to the data compensation part 250.

Figure 10:
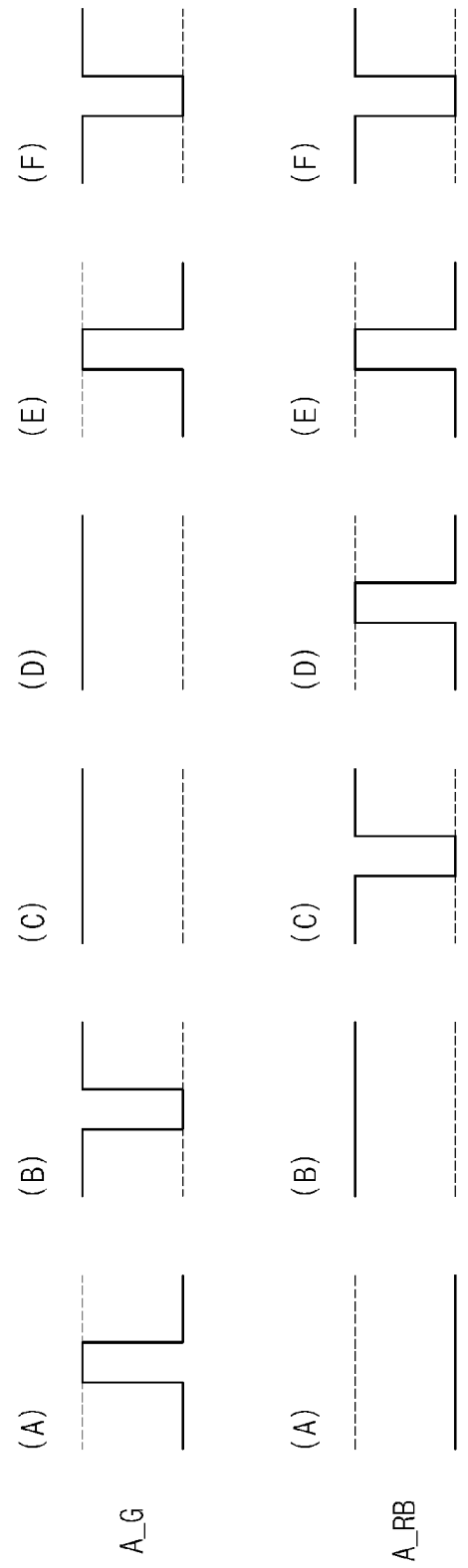
FIG. 10 is a drawing illustrating analysis signals of a reference color and analysis signals of remaining colors when green is the reference color.

FIG. 10 is a drawing illustrating exemplary embodiments of analysis signals A_G of a reference color and analysis signals A_RB of the remaining colors generated when green is set as the reference color. Since green is set as the reference color, the remaining colors are red and blue colors.

As shown in (A) of FIG. 10, when a top signal is generated with respect to the green color and a low signal is generated with respect to the red and blue color, a reference data has information of green and at least a portion of adjacent data has information of black. As shown in (B) of FIG. 10, when a bottom signal is generated with respect to the green color and a low signal is generated with respect to the red and blue colors, the reference data has information of black and at least a portion of adjacent data has information of green. As shown in (C) of FIG. 10, when a high signal is generated with respect to the green color and a bottom signal is generated with respect to the red and blue colors, the reference data has information of green and at least a portion of adjacent data has information of white. As shown in (D) of FIG. 10, when a high signal is generated with respect to the green color and a top signal is generated with respect to the red and blue colors, the reference data has information of white and at least a portion of adjacent data has information of green. As shown in (E) of FIG. 10, when a top signal is generated with respect to the green color and a top signal is generated with respect to the red and blue colors, the reference data has information of white and at least a portion of adjacent data has information of black. As shown in (F) of FIG. 10, when a bottom signal is generated with respect to the green color and a bottom signal is generated with respect to the red and blue colors, the reference data has information of black and at least a portion of adjacent data has information of white.

Referring to FIGS. 3 and 4, the data compensation part 250 detects the color information, text information, background information and a line/edge information in the data provided thereto based on the first histogram signal SGN_H1, the first detection signal SGN_D1 and the analysis signal SGN_A.

The data compensation part 250 compensates data corresponding to a logical pixel that does not include a color pixel corresponding to the color of text among data having information of text (hereinafter it is referred to as text data) based on information analyzed by and provided from the data analysis part 201. The data compensation part 250 generates and provides compensated data RGBW' to the display device 300 of FIG. 1.

In an exemplary embodiment, as shown in FIG. 2, the first logical pixel LP1 of FIG. 6 may include red and green sub-pixels and the second logical pixel LP2 may include blue and white sub-pixels. The second data has information of green text but green color does not displayed in the second logical pixel LP2. Thus, the data compensation part 250 compensates the second data such that the second data has a blue or white grayscale value. In such an embodiment where there color of the text is green, the grayscale value of white color in the second data is compensated.

In such an embodiment, the data compensation part 250 selectively compensates data corresponding to text. Accordingly, in of the exemplary embodiment of FIG. 6, the data compensation part 250 may not compensate the third, sixth and ninth data corresponding to a background.

The data compensation part 250 may not compensate data not having information of text. The data compensation part 250 may not perform a compensation operation when the data compensation part 250 receives the second histogram signal SGN_H2, the second text signal SGN_T2 and/or the second detection signal SGN_D2, and the data compensation part 250 may not perform a compensation operation when all of the analysis signal SGN_A are the high signals or the low signals.

In an alternative exemplary embodiment, data compensation method of the data compensation part 250 may be variously modified.

The data compensation part 250 may independently compensate an edge and line of the text data.

In an exemplary embodiment, the data compensation part 250 may compensate at least one of an edge and line of the text data. In one exemplary embodiment, for example, the data compensation part 250 may compensate only an edge and may not compensate a line. In one alternative exemplary embodiment, for example, the data compensation part 250 may compensate only a line and may not compensate an edge. The data compensation part 250 may compensate both an edge and a line.

The data compensation part 250 may compensate an edge and line of the text data based on different grayscale values from each other. In the exemplary embodiment of FIG. 6, when the second data is an edge, the data compensation part 250 may compensate a white data of the second data such that the white grayscale has 70% of the maximum grayscale. In such an embodiment, when the second data is a line, the data compensation part 250 may compensate the white data of the second data such that the white grayscale has 30% of the maximum grayscale.

The data compensation part 250 may compensate an edge and line of the text data based on different colors from each other. In the exemplary embodiment of FIG. 6, when the second data is an edge, the data compensation part 250 may compensate the white data of the second data to have a specific grayscale and when the second data is a line, the data compensation part 250 may compensate the blue data of the second data to have a specific grayscale.

The data compensation part 250 may compensate the text data based on a background color. The data compensation part 250 may differently compensate text data having a first background color and text data having a second background color different from the first background color. The data compensation part 250 may differently compensate a grayscale value of the text data when the text data is a green text on a black background and a grayscale value of the text data when the text data is a green text on a blue background.

The data compensation part 250 may compensate a grayscale range based on a compensation color of the text data. The data compensation part 250 may compensate a white grayscale of the text data by about 5% to about 20% of the maximum grayscale, and may compensate an optional color grayscale other than red, green, blue and white by about 3% to about 5% of the maximum grayscale.

Figure 11A:
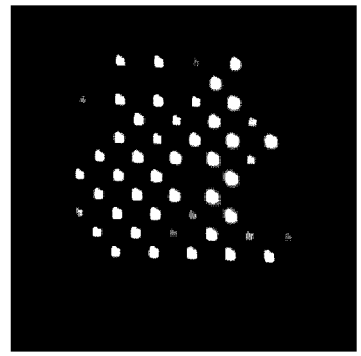
FIGS. 11A and 11B are drawings illustrating images displayed in a conventional display device.
Figure 11B:
Figure 12A:
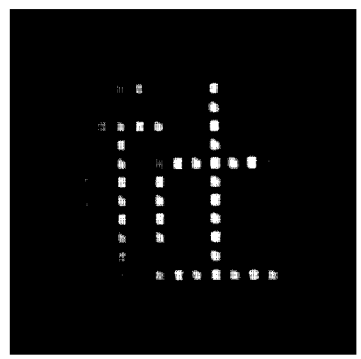
FIGS. 12A and 12B are drawings illustrating images displayed in an exemplary embodiment of a display device according to the invention.
Figure 12B:
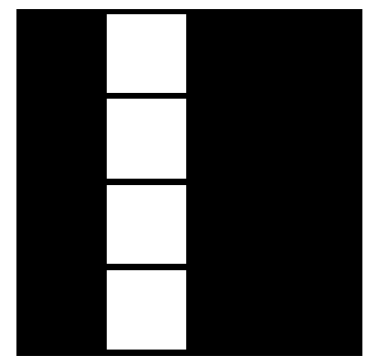

FIGS. 11A and 11B are drawings illustrating images displayed in a conventional display device. FIGS. 12A and 12B are drawings illustrating images displayed in an exemplary embodiment of a display device according to the invention. FIG. 11B shows an enlarged view of four logical pixels of the image of FIG. 11A, and FIG. 12B shows an enlarged view of four logical pixels of the image of FIG. 12A. In FIGS. 11A, 11B, 12A and 12B, a conventional display device and an exemplary embodiment of a display device according to the invention display a same green text on a black background.

As shown in FIGS. 11A, 11B, 12A and 12B, when a conventional display device and an exemplary embodiment of a display device display a same text, in an exemplary embodiment, the data processing device 200 selectively compensates data corresponding to the text such that readability of the text in the image displayed by the exemplary embodiment of the display device is substantially improved compared to readability of text in an image displayed in the conventional display device.

Figure 13:
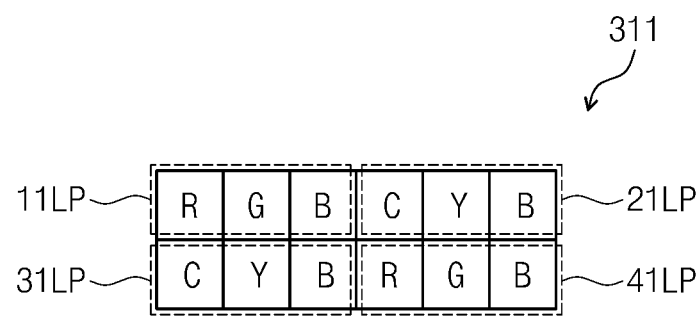
FIGS. 13 through 18 are drawings illustrating exemplary embodiments of a display panel according to the invention.

FIG. 13 is a drawing illustrating an exemplary embodiment of a display panel 311 according to the invention.

The display panel 311 in FIG. 13 is substantially the same as the display panel 310 except for the number of the sub-pixels in one logical pixel and the type of sub-pixels.

Referring to FIG. 13, the display panel 311 may include first through fourth logical pixels 11LP to 41LP. In FIG. 13, only four logical pixels 11LP to 41LP are illustrated for convenience of illustration, but the first through fourth logical pixels 11LP to 41LP may be repeatedly arranged in the display panel 311.

Each of the first logical pixel 11LP and the fourth logical pixel 41LP may include red R sub-pixel, a green G sub-pixel and a blue B sub-pixel. Each of the second logical pixel 21LP and the third logical pixel 31LP may include a cyan C sub-pixel, a yellow Y sub-pixel and a blue B sub-pixel. The red R, green G, blue B, cyan C and yellow Y sub-pixels may have a same size.

Figure 14:
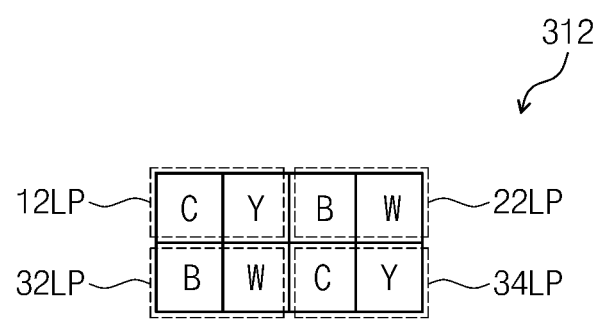

FIG. 14 is a drawing illustrating an alternative exemplary embodiment of a display panel 312 according to the invention.

The display panel 312 may include first through fourth logical pixels 12LP to 42LP. In FIG. 14, only four logical pixels 12LP to 42LP are illustrated for convenience of illustration, but the first through fourth logical pixels 12LP to 42LP may be repeatedly arranged in the display panel 312.

Each of the first logical pixel 12LP and the fourth logical pixel 42LP may include cyan C sub-pixel and a yellow Y sub-pixel. Each of the second logical pixel 22LP and the third logical pixel 32LP may include a blue B sub-pixel and a white W sub-pixel. The white W, blue B, cyan C and yellow Y sub-pixels may have a same size.

Figure 15:
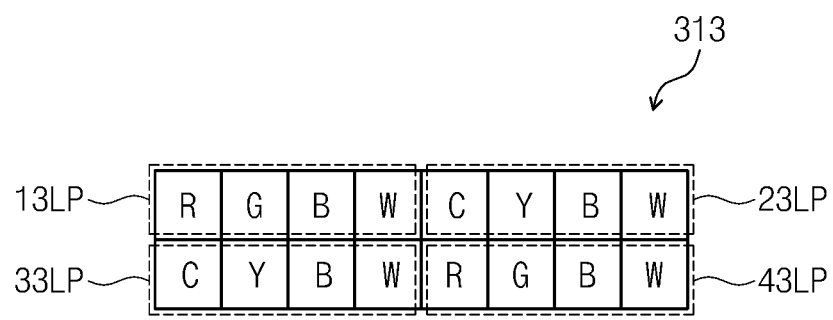

FIG. 15 is a drawing illustrating another alternative exemplary embodiment of a display panel 313 according to the invention.

The display panel 313 may include first through fourth logical pixels 13LP to 43LP. In FIG. 15, only four logical pixels 13LP to 43LP are illustrated for convenience of illustration, but the first through fourth logical pixels 13LP to 43LP may be repeatedly disposed.

Each of the first logical pixel 13LP and the fourth logical pixel 43LP may include red R sub-pixel, a green G sub-pixel, a blue B sub-pixel and a white W sub-pixel. Each of the second logical pixel 23LP and the third logical pixel 33LP may include a cyan C sub-pixel, a yellow sub-pixel, a blue B sub-pixel and a white W sub-pixel. The red R, green G, blue B, cyan C, yellow Y and white W sub-pixels may have a same size.

Figure 16:
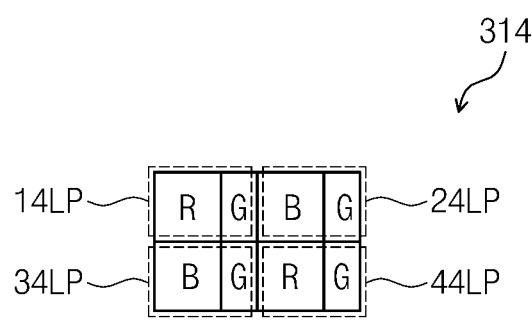

FIG. 16 is a drawing illustrating another alternative exemplary embodiment of a display panel 314 according to the invention.

The display panel 314 may include first through fourth logical pixels 14LP to 44LP. In FIG. 16, only four logical pixels 14LP to 44LP are illustrated for convenience of illustration, but the first through fourth logical pixels 14LP to 44LP may be repeatedly arranged in the display panel 314.

Each of the first logical pixel 14LP and the fourth logical pixel 44LP may include red R sub-pixel and a green G sub-pixel. Each of the second logical pixel 24LP and the third logical pixel 34LP may include a blue B sub-pixel and a green G sub-pixel.

Two sub-pixels in each of the first through fourth logical pixels 14LP to 44LP may have different sizes from each other. A shorter side length of one sub-pixel of the two sub-pixels may be about twice a shorter side length of the other sub-pixel of the two sub-pixels. In the first logical pixel 14LP, a shorter side length of red R sub-pixel may be about twice a shorter side length of green G sub-pixel. Similarly, in the second logical pixel 24LP, a shorter side length of blue B sub-pixel may be about twice a shorter side length of green G sub-pixel.

Figure 17:
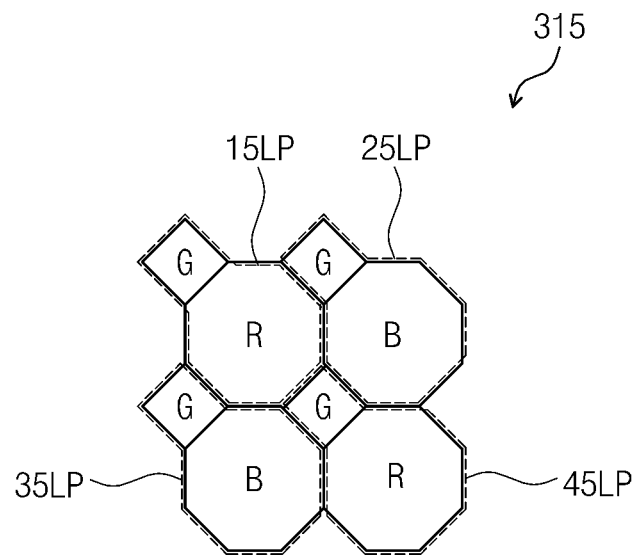

FIG. 17 is a drawing illustrating another alternative exemplary embodiment of a display panel 315 according to the invention.

The display panel 315 may include first through fourth logical pixels 15LP to 45LP. In FIG. 17, only four logical pixels 15LP to 45LP are illustrated for convenience of illustration, but the first through fourth logical pixels 15LP to 45LP may be repeatedly arranged in the display panel 315.

Each of the first logical pixel 15LP and the fourth logical pixel 45LP may include red R sub-pixel and a green G sub-pixel. Each of the second logical pixel 25LP and the third logical pixel 35LP may include a blue B sub-pixel and a green G sub-pixel.

Two sub-pixels included in each of the first through fourth logical pixels 15LP to 45LP may have different shapes from each other.

The green G sub-pixel has a rhombus shape and the red R sub-pixel and the blue sub-pixel may have a hexagonal shape. An area of the green G sub-pixel may be smaller than an area of the blue B sub-pixel and an area of the red R sub-pixel. The sum of the number of the red R sub-pixels and the number of the blue B sub-pixels may be the same as the number of the green G sub-pixels.

A length of a side of the rhombus shape of the green G sub-pixel may be substantially the same as a length of a corresponding side of the hexagonal shape of the blue B sub-pixel and as a length of a corresponding side of the hexagonal shape of the red R sub-pixel. A side of the green G sub-pixel may be disposed to be adjacent and substantially parallel to a side of the red R sub-pixel. A side of the green G sub-pixel may be disposed to be adjacent and substantially parallel to a side of the blue B sub-pixel. The two red R sub-pixels and the two blue B blue sub-pixels may be disposed to surround the green G sub-pixel.

Figure 18:
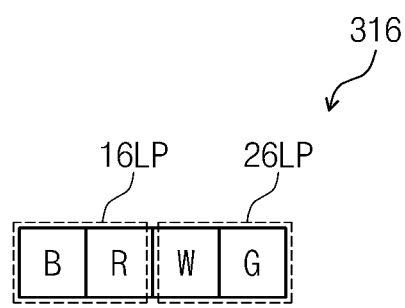

FIG. 18 is a drawing illustrating another alternative exemplary embodiment of a display panel 316 according to the invention.

The display panel 316 may include first and fourth logical pixels 16LP and 26LP. In FIG. 18, only two logical pixels 16LP and 26LP are illustrated for convenience of illustration but the first and fourth logical pixels 16LP and 26LP may be repeatedly arranged in the display panel 316.

The first logical pixel 16LP may include a blue B sub-pixel and a red R sub-pixel. The second logical pixel 26LP may include a white W sub-pixel and a green G sub-pixel. The blue B, red R, white W and green G sub-pixels may have a same size.

According to exemplary embodiments of a data processing device and a display system, readability of text displayed in a display device is substantially improved by compensating data corresponding to a logical pixel that may not display color of the text among data having information of the text.

Although a few embodiments of the invention have been shown and described, it will be appreciated by those skilled in the art that changes may be made in these embodiments without departing from the principles and spirit of the invention, the scope of which is defined in the appended claims and their equivalents. Therefore, the above-disclosed subject matter is to be considered illustrative, and not restrictive.

What is claimed is:

1. A data processing device, which processes and provides data to a plurality of logical pixels of a display device, comprising:
    a data analysis part which analyzes information of text, color, line or edge in each of the data and comprises:
    a histogram analysis part which analyzes the data corresponding to a first logical pixel block, which is defined by at least a portion of the logical pixels, to determine a color of text and background of an image to be displayed in the first logical pixel block;
    a text judgment part which analyzes the data corresponding to a second logical pixel block as a unit of analysis to detect whether or not the data corresponding to the second logical pixel block include the information of text, and outputs a first text signal when the data corresponding to the second logical pixel block include information of text;
    a line/edge detection part which receives the first text signal and analyzes the data corresponding to the second logical pixel block as the unit for analysis to detect whether or not the data corresponding to the second logical pixel block corresponds to a line or an edge; and
    a color analysis part which receives the first text signal and detects colors of the data corresponding to the first logical pixel block; and
    a data compensation part which compensates text data corresponding to a logical pixel which is unable to represent a text color among the data having the information of text based on the information analyzed in the data analysis part,
    wherein each of the logical pixels of the display device comprises only parts of red, green and blue sub-pixels and an optional color sub-pixel.

2. The data processing device of claim 1, wherein the number of the logical pixels which defines the second logical pixel block is less than the number of the logical pixels which defines the first logical pixel block.

3. The data processing device of claim 2, wherein the first logical pixel block comprises 10,000 logical pixels, which are adjacent to one another.

4. The data processing device of claim 2, wherein the second logical pixel block comprises 3 by 3 logical pixels.

5. The data processing device of claim 1, wherein each of the text judgment part, the line/edge detection part and the color analysis part scans an entire of the data corresponding to the first logical pixel block by moving the second logical pixel block by a logical pixel row unit or a logical pixel column unit.

6. The data processing device of claim 1, wherein the histogram analysis part analyzes a distribution of grayscale of each of red, green and blue data of the data corresponding to the first logical pixel block, and
when two or more of the red, green and blue data have a grayscale value greater than a first predetermined value, the histogram analysis part detects a color having the smallest volume of distribution among colors of the of the red, green and blue data as the text color and detects a remaining color of the colors of the of the red, green and blue data as a background color.

7. The data processing device of claim 1, wherein the text judgment part compares a maximum grayscale value of the red, green and blue data of the data corresponding to the second logical pixel block with a second predetermined value to detect whether the information of text exists in the data corresponding to the second logical pixel block or not.

8. The data processing device of claim 7, wherein the text judgment part determines that at least a portion of the data corresponding to the second logical pixel block have the information of text when the maximum grayscale value is greater than the second predetermined value, and
the text judgment part determines that the data corresponding to the second logical pixel block do not have the information of text when the maximum grayscale value is less than the second predetermined value.

9. The data processing device of claim 1, wherein the second logical pixel block comprises a reference logical pixel and adjacent logical pixels surrounding the reference logical pixel, and
the line/edge detection part detects data corresponding to the reference logical pixel as one of a line, an edge and a remainder with respect to each of red, green and blue colors.

10. The data processing device of claim 9, wherein the line/edge detection part detects grayscale differences between the data corresponding to the reference logical pixel and data corresponding to the adjacent logical pixels, respectively,
the line/edge detection part detects a number of a gray scale difference greater than a third predetermined value among the detected grayscale differences, and
the line/edge detection part detects the data corresponding to the reference logical pixel as any one of the line, the edge and the remainder based on the detected number.

11. The data processing device of claim 10, wherein the second logical pixel block comprises 3×3 logical pixels,
the line/edge detection part determines the reference data as an edge when the detected number of the grayscale difference greater than the third predetermined value, which is denoted by N, satisfies the following in equation: $0 \leq N \leq 3$,
the line/edge detection part determines the reference data as a line when the detected number of the grayscale difference greater than the third predetermined value satisfies the following in equation: $3 \leq N \leq 8$, and
the line/edge detection part determines the reference data as the remainder when the detected number of the grayscale difference greater than the third predetermined value is zero.

12. The data processing device of claim 1, wherein the second logical pixel block comprises a reference logical pixel and adjacent logical pixels surrounding the reference logical pixel, and the color analysis part generates an analysis signal of data corresponding to the reference logical pixel for each of the red, green and blue data, and provides the analysis data to the data compensation part.

13. The data processing device of claim 12, wherein
the analysis signal comprises an analysis signal of a reference color and an analysis signal of remaining colors different from the reference color.

14. The data processing device of claim 13, wherein
each of the analysis signal of the reference color and the analysis signal of the remaining colors is one of a top signal, a bottom signal, a high signal and a low signal,
the top signal is generated when data of the reference color exists in data corresponding to the reference logical pixel and data of the reference color does not exist in data corresponding to the adjacent logical pixels,
the bottom signal is generated when data of the reference color does not exist in data corresponding to the reference logical pixel and data of the reference color exists in the data corresponding to the adjacent logical pixels,
the high signal is generated when data of the reference color exists in data corresponding to the reference logical pixel and the data corresponding to the adjacent logical pixels, and
the low signal is generated when data of the reference color does not exist in data corresponding to the reference logical pixel and the data corresponding to the adjacent logical pixels.

15. The data processing device of claim 1, wherein
the data compensation part compensates at least one of an edge and a line of the text data.

16. The data processing device of claim 15, wherein
the data compensation part compensates the edge and the line of the text data based on different grayscale values from each other.

17. The data processing device of claim 15, wherein
the data compensation part compensates the edge and the line of the text data based on different colors from each other.

18. The data processing device of claim 1, wherein
the data compensation part differently compensates text data having a first background color and text data having a second background color different from the first background color.

19. The data processing device of claim 2, wherein
the data compensation part differently compensates a grayscale range for different compensation colors of the text data.

20. The data processing device of claim 19, wherein
the data compensation part compensates a white grayscale of the text data by 5% to 20% of the maximum grayscale thereof, and compensates an optional color grayscale other than the red, green, blue and white color by 3% to 5% of the maximum grayscale thereof.

21. A display system comprising:
a display device comprising a plurality of logical pixels, wherein each of the logical pixels comprises only parts of red, green and blue sub-pixels and an optional sub-pixel;
a rendering part which receives an image data and renders the received image data to generate rendered image data; and
a data processing device which processes and provides the rendered image data to the display device,
wherein the data processing device comprises:
a data analysis part which analyzes information of text, color, line or edge of the rendered image data and comprises:
a histogram analysis part which analyzes data corresponding to a first logical pixel block, which is defined by at least a portion of the logical pixels, to determine a color of text and background of an image to be displayed in the first logical pixel block;
a text judgment part which analyzes the data corresponding to a second logical pixel block as a unit of analysis to detect whether or not the data corresponding to the second logical pixel block include the information of text, and outputs a first text signal when the data corresponding to the second logical pixel block include the information of text;
a line/edge detection part which receives the first text signal and analyzes the data corresponding to the second logical pixel block as the unit of analysis to detect whether or not the data corresponding to the second logical pixel block corresponds to a line or an edge; and
a color analysis part which receives the first text signal and detects colors of the data corresponding to the first logical pixel block; and
a data compensation part which compensates text data corresponding to a logical pixel which is unable to represent a text color among data having the information of text based on the information analyzed in the data analysis part.

22. The display system of claim 21, wherein the rendering part maps a red, green and blue gamut of red, green and blue data of the image data to red, green, blue and optional color gamut.

* * * * *